Figure 1:
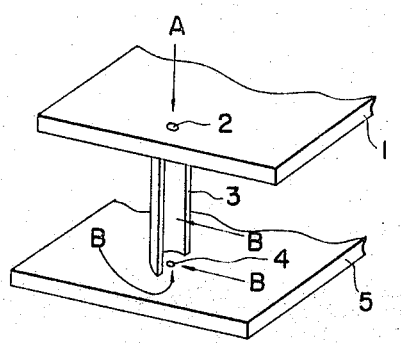

Sept. 19, 1967   KITAO SHIMIZU ETAL   3,341,891
PRODUCTION OF A COMPOSITE FILAMENT AND A SPINNERET ASSEMBLY
Filed July 31, 1963                                4 Sheets-Sheet 1

INVENTORS
KITAO SHIMIZU
KAZUO YUKI
MIYOSHI OKAMOTO
ATTORNEY

Fig. 13  Fig. 14  Fig. 15
Fig. 16  Fig. 17
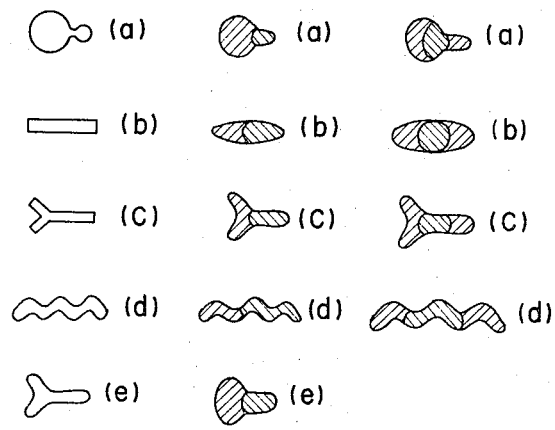
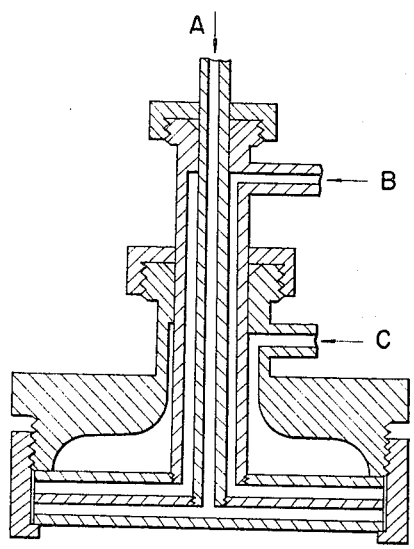
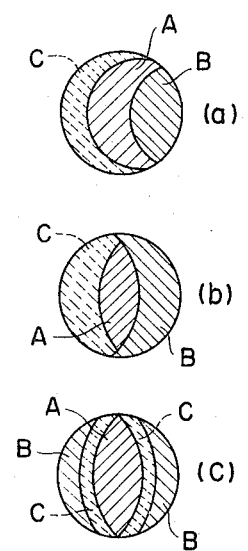

Patented Sept. 19, 1967

3,341,891
PRODUCTION OF A COMPOSITE FILAMENT AND
A SPINNERET ASSEMBLY
Kitao Shimizu, Kazuo Yuki, and Miyoshi Okamoto, Iyogun, Ehime-ken, Japan, assignors to Toyo Rayon Kabushiki Kaisha, Tokyo, Japan, a corporation of Japan
Filed July 31, 1963, Ser. No. 298,883
Claims priority, application Japan, Aug. 6, 1962, 37/32,487; Apr. 19, 1963, 38/19,965, 38/19,966
5 Claims. (Cl. 18—8)

This invention relates to a process for the production of a composite filament and to a spinneret assembly for use in the process.

There has been an attempt made to prepare a composit filament by extruding at least two fiber-forming liquids through a spinneret having one or more extrusion orifices, in which one of the liquids is caused to flow on a surface of the spinneret towards each orifice while a jet of the other liquid is caused to flow towards each orifice from a direction perpendicular to the surface of the spinneret. The jet of the latter liquid may be produced by extruding the liquid through another plate having one or more apertures each of which has an axis common to that of the opposite orifice of the spinneret plate. Unfortunately, the jet would be apt to diverge in a space between the two plates and to result in filaments composed exclusively of one or the other component.

In order to render the attempt successful, British Patent No. 830,441 proposes that at least one of the plates should be provided with a plateau-like protrusion, which extends about the axis common to the aperture and orifice so as to cause the liquid to flow towards the orifice from all directions on the spinneret. Thus, a composite filament of sheath-core structure has been successfully produced.

However, the plateaus invite liquid resistance of high degree. In other words, the pressure drop is considerably large in the region of the plateaus. Slight variations in the design as well as machining of the plateaus will aggravate the variations in the liquid pressure at the orifices. Hence, it is highly difficult to increase the numbers of orifices in a spinneret without sacrificing the uniformity in the deniers and/or constructions of the composite filaments.

It is therefore a primary object of this invention to provide a process for producing a composite filament of side-by-side structure.

Another object of the invention is to provide a process for producing highly multiple filaments consisting of composite filaments of high uniformity in the deniers and/or constructions.

A further object of this invention is to provide a spinneret assembly suitable for use in the foregoing processes and the fabrication of which is easy.

Other objects and advantages of the present will become apparent from the following description.

According to the invention there is provided a process for the production of a composite filament by extruding at least two fiber-forming liquids through a spinneret having a plurality of orifices, wherein one of said fiber-forming liquids is supplied towards each orifice from a direction in a plane perpendicular to the axis of the orifice while the other of said fiber-forming liquids is supplied towards each orifice substantially parallel to the axis of the orifice, characterized in that one of said fiber-forming liquids is supplied towards each orifice predominantly from not exceeding two directions in a plane perpendicular to the axis of the orifice and stays substantially about the orifice.

This invention also provides a spinneret assembly for use in the process. It comprises a spinneret plate, a distributing plate facing the spinneret plate and spaced apart therefrom, the spinneret plate being provided with a plurality of orifices therethrough, the distributing plate being provided with a plurality of apertures therethrough, a first liquid-supply chamber behind the distributing plate and in communication with aperture thereof, means for guiding a second liquid in the space between the two plates so as to cause the liquid to flow towards each orifice predominantly from not exceeding two directions in a plane perpendicular to the axis of the orifice and stay substantially about the orifice and thus prevent the stream of the first liquid from diverging on its path from aperture to orifice, and a second liquid-supply chamber communicating with the space between the two plates 1.

Figure 2:
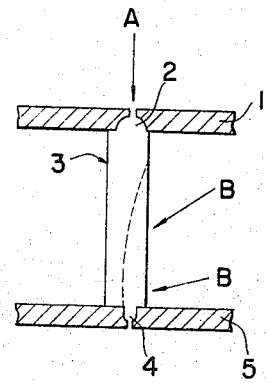

Referring to the accompanying drawings, FIGS. 1 and 2 are drawings for illustrating the principles on which this invention is based. A distributing plate 1 is provided with a plurality of apertures 2 for distributing a first liquid A, while a spinneret plate 5 is provided with a plurality of orifices 4 for extruding the combined liquids. Baffle 3 surrounding a line of flow of the liquid A with one side open extends vertically from the plate 1 to plate 5. Horizontal sections of baffle 3 may vary as shown in FIGS. 3a–3d. Baffle 3 guides a second liquid B in the space between the two plates so as to cause the liquid B to flow towards orifice 4 from the open side of baffle 3 and stay substantially in the region surrounded by baffle 3. Thus the stream of the first liquid A is prevented from diverging by the wall of baffle 3 and the stream of the liquid B. Some of the cross sections of the resulting composite filaments are illustrated in FIG. 4. According to this invention, the stream of the liquid A need not be a jet. Neither is it necessary for the axis of the aperture and that of the orifice to be in common. If circumstances do not permit, the axis of the aperture need not pass through the interior of the orifice either. Furthermore, neither is it necessary to narrow the distance between the two plates, it being possible that this distance is of the order of several millimeters.

Figure 5:
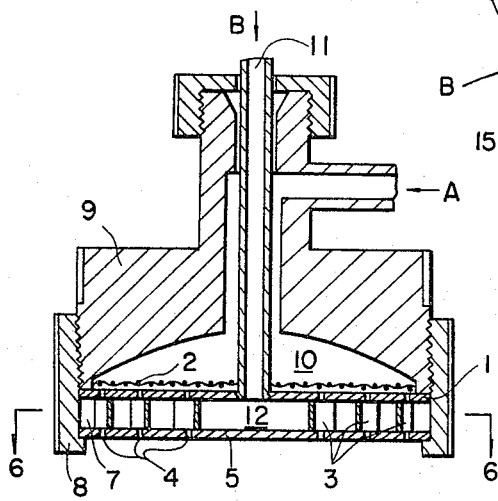
Figure 6:
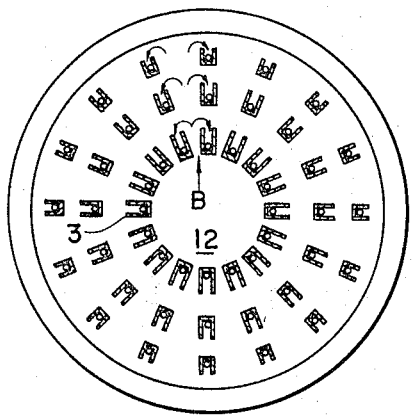

FIGS. 5 and 6 show one embodiment of the invention. FIG. 5 is an axial longitudinal section through a spinneret assembly according to the invention. FIG. 6 is a transverse cross section of the assembly of FIG. 5 taken along line 6—6 to show the spinneret plate and the means for guiding the second liquid. A circular spinneret plate 5 is provided with 48 orifices 4 therethrough, which are located on three imaginary concentric circles. A circular distributing plate 1 has 48 apertures similarly located. The two plates are retained in place by means of a spacing ring 7, a cap 8 and a housing 9. The inner part of housing 9 constitutes a first liquid-supply chamber 10, which being located behind the plate 1 can distribute the liquid A to each aperture of plate 1. A relatively large space of the chamber 10 ensures uniformity in the distributing pressures of the liquid A. An orifice and aperture in a pair are surrounded by a baffle 3, which extends from plate 1 to plate 5 and opens towards the outer edges of the plates. A second liquid B is supplied from its supply chamber (not shown) to a central portion 12 of the space between the two plates via a pipe 11 passing through the housing 9. Liquid B is then, as shown by the arrows in FIG. 6, guided from the central portion 12 outwardly to flow to the orifices 4 from the side of baffles 3 which is open and stay substantially at the inner side of the baffles 3. The closer to the center of spinneret plate 5 that the orifice is located, the deeper or more extended is the wall of baffle 3.

Figure 7:
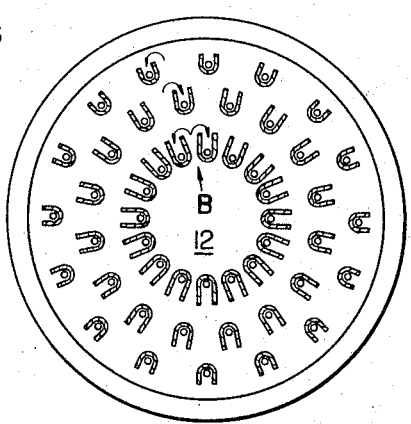

FIG. 7 shows another arrangement in the orifices and baffles 3.

Figure 8:
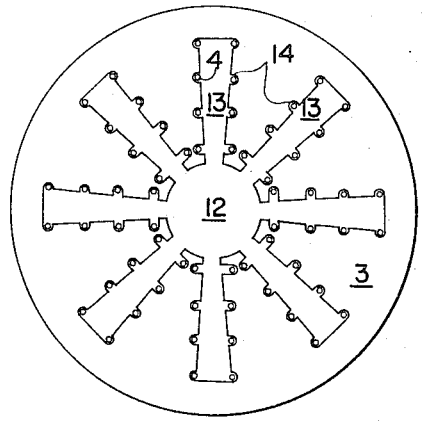

In FIG. 8 is shown another variation in the arrangement of the orifices and means for guiding the second liquid. The spinneret plate has 64 orifices located as shown. Means 3 for guiding the second liquid is provided with a common central space 12 communicating with a second liquid-supply chamber (not shown), a plurality of grooves 13 elongating radially from the common central space 12, and a plurality of second liquid staying rooms 14 which are located on both sides of each groove symmetrically with respect to a center line of the groove and in each of which passes a line of flow of the first liquid. Means 3 can guide the second liquid in the space between the two plates from the common central space 12 to each of the grooves 13 and to each of the second liquid staying rooms 14 so as to cause the second liquid to flow towards each orifice predominantly from one direction and let it stay substantially in the staying room 14, i.e., about the orifice. The stream of the first liquid is prevented from diverging by the walls of the staying room 14 and by the stream of the second liquid coming into the staying room 14.

Figure 10:
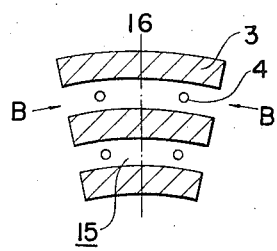
Figure 9:
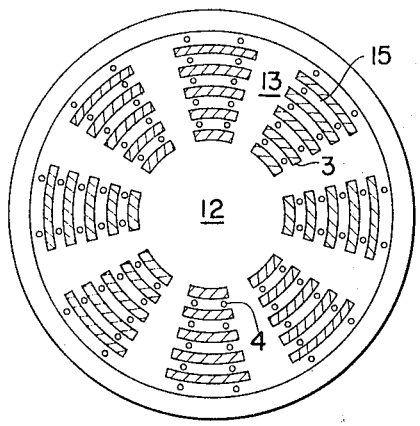

FIG. 9 shows still another means for guiding the second liquid and a modification in the location of the orifices. This is an embodiment in which each of the staying rooms 14 of a groove is connected with its counterpart in an adjoining groove by way of a communicating channel 15. A spinneret plate has 80 orifices located as shown. Means 3 for guiding the second liquid is provided with a common central space 12 communicating with a second liquid-supply chamber (not shown), a plurality of grooves 13 elongating radially from the common central space 12, and a plurality of communicating channels 15 connecting the adjoining grooves, in each of which communicating channel 15 being located two orifices symmetrically with respect to a center line 16 of a set of communicating channels which connect the two adjoining grooves as shown in FIG. 10. The second liquid flowing from the central space 12 passes through grooves 13 and thence to the communicating channels 15. A dead space is formed at the part of the center line 16. In other words, the plane including the center line 16 and perpendicular to the spinneret plate acts as if a wall exists, because of the collision there of the liquid flowing in from the two ends of the communicating channels 15. Hence, there is formed a second liquid staying room about each of the orifices.

Figure 18:
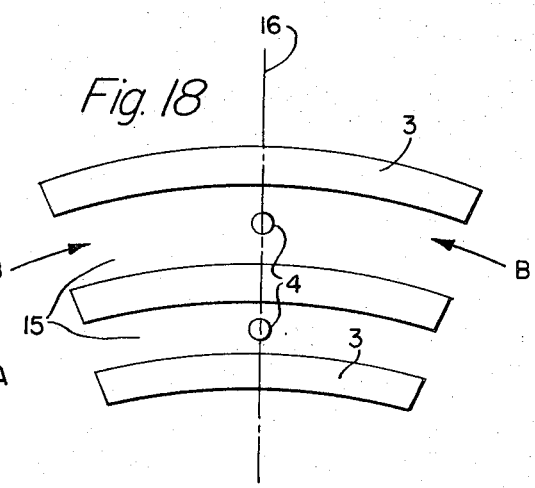
Figure 11:
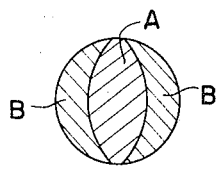

As already stated previously, in the spinneret assembly according to this invention there is no need for the axis of an aperture of the distributing plate and that of an orifice of the spinneret plate being precisely in common. By the use of a spinneret plate shown in either FIGS. 8 or 9 composite filaments having cross sections as shown in FIG. 4 can be obtained. Surprisingly, composite filaments having cross sections shown in FIG. 4 were obtained even when the spinneret shown in FIG. 9 was used with a distributing plate having one aperture relative to the two orifices of each of the communicating channels 15. Further, when the two apertures of each of the communicating channels were disposed opposite a single orifice as shown in FIG. 18 (in this case the single orifice was disposed on the center 16), the liquid B in the communicating channel 15 was caused to flow towards the orifice predominantly from the two opposite directions, and a composite filament having a sandwich type cross-sectional structure, as shown in FIG. 11, was obtained.

Figure 3:
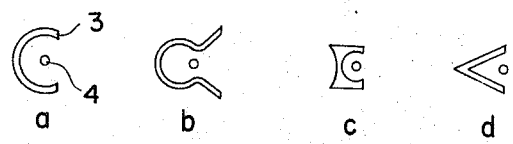
Figure 4:
Figure 12:
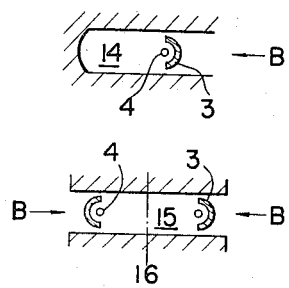

Further, as shown in FIG. 12, it is also possible to provide the baffle 3 shown in FIG. 3 in the staying room 14 of FIG. 8 or the communicating channel 15 of FIG. 9.

On the other hand, if a spinneret in which its orifices are of non-circular form is used, a composite filament of non-circular cross section can be obtained. FIG. 13 shows various orifices of non-circular form. By disposing these orifices of non-circular form in a suitable location in the staying part, as described hereinbefore, it becomes possible to produce either the side-by-side type or the sandwich type composite filament. The filaments shown in FIG. 14 are composite filaments of the side-by-side type, which were obtained by disposing the orifices of non-circular form as shown in FIGS. 6–9. On the other hand, the composite filaments of the sandwich type shown in FIG. 15 can readily be obtained by using a spinneret assembly of a construction in which a single orifice is disposed opposite the two apertures in each of the communicating channels 15.

Further, if, for example, an assembly such as shown in FIG. 16 is used, a three-component filament can be prepared. In FIG. 17 are shown the cross sections of the various three-component filaments that are obtained by using the assembly of FIG. 16. The production of composite filaments of four or more components is also possible using like procedures and equipment.

In introducing the second liquid B to between the two plates according to the process and apparatus of this invention, it is not necessarily critical that it be introduced at the central part of the spinneret plate, it being also possible to design the spinneret so that liquid B is caused to flow towards the center of the spinneret plate. The gist lies in providing between two plates a means for guiding the second liquid B thereby supplying said liquid towards each orifice predominantly from one or two directions in a plane perpendicular to the axis of the orifice and causing said liquid to be in a stayed state about the orifice. Additionally, according to the process of this invention it is required that the streams of each of the liquids become a laminar flow.

According to the present invention, as there is no particular need for making the distance between the two plates narrow, variations in pressures of the liquid at the orifices can be minimized thereby making possible the production of composite filaments the deniers and construction of which are uniform. Further, since the distance between the orifices of the spinneret plate can be reduced, the orifice density (number of orifices in a unit area of the spinneret plate) can be increased. Additionally, there is the advantage in the case of the spinneret assembly of this invention that slight errors in design and fabrication thereof do not adversely affect its quality to a notable extent and also in that it is easily fabricated.

*Example 1*

Using as liquid A a viscose of a pulp containing 7.5% cellulose, 6.3% alkali and 35% carbon disulphide and having a degree of polymerization of 350, a falling-ball viscosity of 40 seconds and a Hottenroth number of 20, and as liquid B a viscose of a pulp containing 6% cellulose, 4% alkali and 40% carbon disulphide and having a degree of polymerization of 500, a falling-ball viscosity of 200 seconds and a Hottenroth number of 6, the two liquids were extruded at a spinning speed of 35 m./min. in such a manner that the liquid ratio of A:B would become 6:4, from an 80-hole composite filament spinneret (FIG. 9) having distributing plate apertures 0.04 mm. in diameter, bottom spinneret plate orifices 0.05 mm. in diameter and a distance between the distributing plate and spinneret plate of 4 mm., into a 90° C. bath containing 1% sulfuric acid where regeneration was effected followed by winding up the resultant 10 denier filament. In this case, the occurrence of clogging of spinneret was not observed at all. Further, for investigating the manner in which each component had been combined, as the B liquid a viscose to which had been added carbon black so that its content would become 5% was used and a composite filament was spun following exactly the same procedures as described above. When a cross section of the so obtained filament was examined with a microscope, it was observed that there was uniformity in the manner in which each component filament was combined in the composite filament.

*Example 2*

Using as the A liquid a 25% solution in dimethyl formamide of a polymer having an intrinsic viscosity of 1.60 obtained by copolymerizing a mixture of acrylonitrile and 2 mole percent and 0.5 mole percent thereof of methyl acrylate and sodium allyl sulfonate, respectively, and as liquid B a 22% solution in dimethylformamide of a polymer having an intrinsic viscosity of 1.89 obtained by copolymerizing a mixture of acrylonitrile and 8 mole percent and 0.5 mole percent thereof of methyl acrylate and sodium styrene sulfonate, respectively, to which was added further 0.01% of carbon black, based on the polymer, a composite filament was spun with a liquid ratio of A:B=5:5 at a spinning speed of 150 m./min. employing a 64-hole composite filament spinneret (FIG. 8) having distributing plate apertures 0.16 mm. in diameter, bottom spinneret plate orifices 0.16 mm. in diameter and a distance between the distributing plate and spinneret plate of 4 mm., after which the filament was wound up. The spinning solution, both A and B, which were 105° C., when coming out of a heater of a mixed gas of carbon dioxide and nitrogen gas attained a temperature 315° C., at which states they were passed through the spinning cell at a fluid speed of 25 kg./hr. The temperature of the spinning cell was 180° C. The 64 ends of the 4 denier composite filaments, when examined with a microscope as to their cross section showed that they had been combined favorably in a 5:5 ratio.

*Example 3*

As liquid A was used a polyethylene terephthalate having an intrinsic viscosity of 0.68 in ortho-chlorophenol at 25° C. obtained by effecting the ester interchange of 2.3 moles of ethylene glycol and 1 mole of dimethyl terephthalate followed by polymerization under reduced pressure, and as liquid B was used a copolymer having an intrinsic viscosity of 0.72 obtained by effecting the ester interchange of 2.5 moles of ethylene glycol and 1 mole of dimethyl terephthalate in the presence of 0.1 mole of isophthalic acid and 0.008% of carbon black, based on the dimethyl terephthalate, followed by polymerization under reduced pressure. The composite filament spinneret (FIG. 8) employed contained 64 holes and had distributing plate apertures 0.4 mm. in diameter, bottom spinneret plate orifices 0.3 mm. in diameter and a distance between the distributing plate and spinneret plate of 3 mm. Liquids A and B were melted at 290° C. and 275° C., respectively, and then extruded through the foregoing spinneret heated to 283° C. into a stream of 25° C. air at the rate of 25 m./min., and a composite ratio of A:B=4:6 followed by winding up the filaments at 850 m./min. When the cross sections of the filaments were examined with a microscope, it was observed that the composite ratio of each filament was 4:6.

*Example 4*

The following three polymers A, B and C were spun into a composite filament.

(A) Polymer chips obtained by adding 0.4% of titanium dioxide and 0.37% of carbon black to a polymer having an intrinsic viscosity of 0.68 in ortho-chlorophenol at 25° C. obtained by effecting the ester-interchange at 197° C. of ethylene glycol and dimethyl terephthalate followed by polymerizing at 275° C. under reduced pressure.

(B) Polymer chips having an intrinsic viscosity of 0.78 in ortho-chlorophenol at 25° C. obtained by carrying out the ester-interchange as in A but by adding to dimethyl terephthalate 8 mole percent, based thereon, of dimethyl isophthalate followed by adding 0.1% of a blue pigment Phthalocyanine Blue and thereafter effecting the polymerization.

(C) Polymer chips having an intrinsic viscosity of 0.77 in orthochlorophenol at 25° C. obtained by the same procedures as in A but by adding to dimethyl terephthalate 8 mole percent, based thereon, of adipic acid and also adding prior to initiating the polymerization 0.2% of a green pigment Phthalocyanine Green.

These chips A, B and C were melted at 290° C. and were spun at 285° C. by introducing and combining the three fluids in the sequence of A, B and C from the top of the spinneret assembly and so as to achieve a composite ratio A:B:C=1:1:1.

The spinneret assembly used in this instance was a 64-hole spinneret having a first distributing plate and a second distributing plate both whose apertures were 0.4 mm. in diameter, spinneret plate orifices 0.25 mm. in diameter, and a distance between the spinneret plate and the first distributing plate and that between the first and second distributing plates both of which were 3 mm.

The filaments which were so extruded into 20° C. air were taken up at 800 m./min. The freshly spun filaments were drawn at 83° C. at a drawing speed of 60 m./min., and a draw ratio of 3.75 to yield 4 denier filaments. The yarn obtained by placing these filaments in hot boiling water at 93° C. containing 0.6% polyethylene glycol lauryl ether followed by drying for 10 minutes at 140° C. crimped satisfactorily and exhibited a mysterious iridescent luster.

What is claimed is:

1. A spinneret assembly for use in the production of a composite filament which comprises a spinneret plate, a distributing plate facing the spinneret plate and spaced apart therefrom, the spinneret plate being provided with a plurality of orifices therethrough, the distributing plate being provided with a plurality of apertures therethrough, a first liquid-supply chamber behind the distributing plate and in communication with each aperture thereof, means for guiding a second liquid in the space between the two plates so as to supply the liquid towards each orifice predominantly from not exceeding two directions in a plane perpendicular to the axis of the orifice, each aperture of the distributing plate being open directly to the space between the two plates whereby the first liquid meets the second liquid staying substantially about the orifice, and a second liquid-supply chamber communicating with the space between the two plates.

2. A spinneret assembly for use in the production of a composite filament which comprises a spinneret plate, a distributing plate facing the spinneret plate and spaced apart therefrom, the spinneret plate being provided with a plurality of orifices therethrough, the distributing plate being provided with a plurality of apertures each of which is opposite each orifice in the spinneret plate, a first liquid-supply chamber behind the distributing plate and in communication with each aperture thereof, a plurality of baffles extending vertically from the spinneret plate to the distributing plate, each baffle partially surrounding a line of uow of the first liquid and being open at one side so as to guide a second liquid to flow towards each orifice from the open side and let the liquid stay substantially about the orifice, and a second liquid-supply chamber communicating with the space between the two plates.

3. A spinneret assembly for use in the production of a composite filament which comprises a spinneret plate, a distributing plate facing the spinneret plate and spaced apart therefrom, the spinneret plate being provided with a plurality of orifices therethrough, the distributing plate being provided with a plurality of apertures each of which is opposite each orifice in the spinneret plate, a first liquid-supply chamber behind the distributing plate and in communication with each aperture thereof, one of the plates, on the side facing the other plate, being provided with means for guiding a second liquid, said means being provided with a common central space, a plurality of grooves elongating in the space between the two plates radially from the common central space and a plurality of staying rooms located on both sides of each groove symmetrically relative to a central line of the groove, in each of the staying rooms there opening an aperture and an orifice in a pair so as to cause a line of flow of the first liquid to pass through the staying room, said means thereby causing the second liquid to flow towards each orifice predominantly from one direction and to stay substantially in the staying room, and a second liquid-supply chamber communicating with the common central space of said means.

4. A spinneret assembly for use in the production of a composite filament which comprises a spinneret plate, a distributing plate facing the spinneret plate and spaced apart therefrom, the spinneret plate being provided with a plurality of orifices therethrough, the distributing plate being provided with a plurality of apertures each of which is opposite each orifice in the spinneret plate, a first liquid-supply chamber behind the distributing plate and in communication with each aperture thereof, one of the plates on the side facing the other plate, being provided with means for guiding a second liquid, said means being provided with a common central space, a plurality of grooves elongating in the space between the two plates radially from the common central space and a plurality of sets of communicating channels, each set of said communicating channels connecting the two adjoining grooves and being located radially and concentrically, in each of the communicating channels there opening two sets of an aperture and orifice in a pair so located symmetrically relative to a center line of the set of communicating channels as to cause two lines of flow of the first liquid to pass through the communicating channels, said means thereby introducing the second liquid from both ends of each of the communicating channels to cause a collision of the two streams of the second liquid at the central part of the communicating channels, with the consequence that the second liquid is caused to flow to each orifice predominately from one direction and to stay substantially thereabout, and a second liquid-supply chamber communicating with the common central space.

5. A spinneret assembly for use in the production of a composite filament which comprises a spinneret plate, a distributing plate facing the spinneret plate and spaced apart therefrom, the spinneret plate being provided with a plurality of orifices therethrough, the distributing plate being provided with a plurality of apertures therethrough, a first liquid-supply chamber behind the distributing plate and in communication with each aperture thereof, one of the plates, on the side facing the other plate, being provided with means for guiding a second liquid, said means being provided with a common central space, a plurality of grooves elongating in the space between the two plates radially from the common central space and a plurality of sets of communicating channels, each set of said communicating channels connecting the two adjoining grooves and being located radially and concentrically, in each of the communicating channels there opening a set of two apertures and one orifice, said one orifice being located at the center of the channel, said two apertures being located symmetrically relative to said one orifice, said means thereby introducing the second liquid from both ends of each communicating channel to cause a collision of the two streams of the second liquid on each orifice, with the consequence that the second liquid is caused to flow to each orifice predominantly from two directions and to stay substantially thereabout, and a second liquid-supply chamber communicating with the common central space.

References Cited
UNITED STATES PATENTS

| | | | |
|---|---|---|---|
| 2,931,091 | 4/1960 | Breen | 18—8 X |
| 2,987,797 | 6/1961 | Breen. | |
| 3,176,343 | 4/1965 | Calaway et al. | |

FOREIGN PATENTS 355,247  8/1961  Switzerland.

WILLIAM J. STEPHENSON, *Primary Examiner*.